US012597077B2

(12) United States Patent
Kallenbach

(10) Patent No.: US 12,597,077 B2
(45) Date of Patent: Apr. 7, 2026

(54) PROCURE TO PAY DEDUCTION MANAGEMENT PROCESS

(71) Applicant: Gary Kevin Kallenbach, Atlanta, GA (US)

(72) Inventor: Gary Kevin Kallenbach, Atlanta, GA (US)

( * ) Notice: Subject to any disclaimer, the term of this patent is extended or adjusted under 35 U.S.C. 154(b) by 0 days.

(21) Appl. No.: 18/511,823

(22) Filed: Nov. 16, 2023

(65) Prior Publication Data

US 2025/0166084 A1 May 22, 2025

(51) Int. Cl.
G06Q 40/00 (2023.01)
G06Q 10/063 (2023.01)
G06Q 40/12 (2023.01)

(52) U.S. Cl.
CPC ........... G06Q 40/12 (2013.12); G06Q 10/063 (2013.01)

(58) Field of Classification Search
CPC .............................. G06Q 40/12; G06Q 10/063
See application file for complete search history.

(56) References Cited

U.S. PATENT DOCUMENTS

2009/0187433 A1* 7/2009 Nudd ..................... G06Q 40/08
705/4
2013/0103433 A1* 4/2013 Corben .................. G06Q 40/00
705/4

* cited by examiner

*Primary Examiner* — Rokib Masud
(74) *Attorney, Agent, or Firm* — Michelle Kallenbach

(57) ABSTRACT

Simple step-by-step methods for business management to implement in-house to detect overlooked or forgotten assets and demand for credits or money rightfully owed to it, resulting in increased profitability. Instead of hiring a costly outside asset recovery company to perform an audit, who typically charge around 25% of the recovered amount, businesses can keep all that is recovered. By following the easy steps, businesses can stay ahead of not getting paid or credited for overlooked or forgotten credits, including from the return of previously purchased commodities, the disposal of electronic commodities via e-recycler for credits and credits obtained from warranty claims.

3 Claims, 3 Drawing Sheets

PROCURE TO PAY DEDUCTION MANAGEMENT PROCESS

CROSS-REFERENCE TO RELATED APPLICATIONS

This application claims the benefit of U.S. Provisional Application 63/425,711 filed on Nov. 16, 2022, titled PROCURE TO PAY DEDUCTION MANAGEMENT PROCESS, which is herein incorporated by reference in its entirety.

STATEMENT REGARDING FEDERALLY SPONSORED RESEARCH OF DEVELOPMENT (IF APPLICABLE)

"Not Applicable"

REFERENCE TO A SEQUENCE LISTING, A LARGE TABLE, OR A COMPUTER PROGRAM LISTING APPENDIX ON READ-ONLY OPTICAL DISC (IF APPLICABLE)

"Not Applicable"

BACKGROUND OF THE INVENTION

The embodiments described herein relate to step-by-step methods for in-house business management to follow to recover overlooked or forgotten assets, including the return of previously purchased commodities for credits, disposal of electronic items via an e-recycler for credits, and warranty credits.

An additional benefit in performing the step-by-step process for returns for credits, e-recycler for credits and warranty credits, can lead to the identification of continuing errors of overlooked or forgotten credits, which business management can then address and resolve.

BRIEF DESCRIPTION OF THE INVENTION

This invention describes easy to follow steps and technology for business management to utilize to detect, record, deduct and demand for credits or money rightfully owed to their business, resulting in increased profitability.

By following the process step-by-step, business management can proactively take the risk out of not getting paid for overlooked or forgotten credits in a timely manner, if at all.

There are business managements who believe the only option they have is to hire an asset recovery company to perform an audit. Asset recovery companies typically charge around 25% of the amount they recover. By the time they finish the audit, it's time for another one.

Another problem with audits is that they are performed after the fact and do not address how to rectify continuing errors.

Instead of hiring a costly outside asset recovery company, business management can simply implement the easy to follow steps and technology of this invention in-house and can stay ahead of the overlooked and forgotten credits.

Another advantage of following the simple steps described in this invention is that continuing errors are identified, which business management can address and resolve.

This invention provides detailed steps of demanding credits and money rightfully owed to the business, resulting in increased profitability, without giving up 25% of the amount recovered.

BRIEF DESCRIPTION OF THE SEVERAL VIEWS OF THE DRAWING

The accompanying drawings, which are incorporated in and constitute a part of this specification, illustrate several embodiments and together with the description, serve to explain the principles of the methods and systems. The drawings illustrate generally, by way of example, but not by way of limitation, various embodiments discussed in the present document.

DETAILED DESCRIPTION OF THE INVENTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limited.

The method is easily applied to different areas, including, but not limited to: the return of previously purchased commodities, the disposal of electronic equipment via an e-recycler and warranty credits.

Business management has the choice to implement only one, two, or all three areas, whichever best suits their business needs. However, for optimum results, all three of the areas should be used concurrently, to reap the benefits of their synergy.

Following is a step-by-step explanation on how to apply the methods to each of the above-referenced areas.

Figure 1:
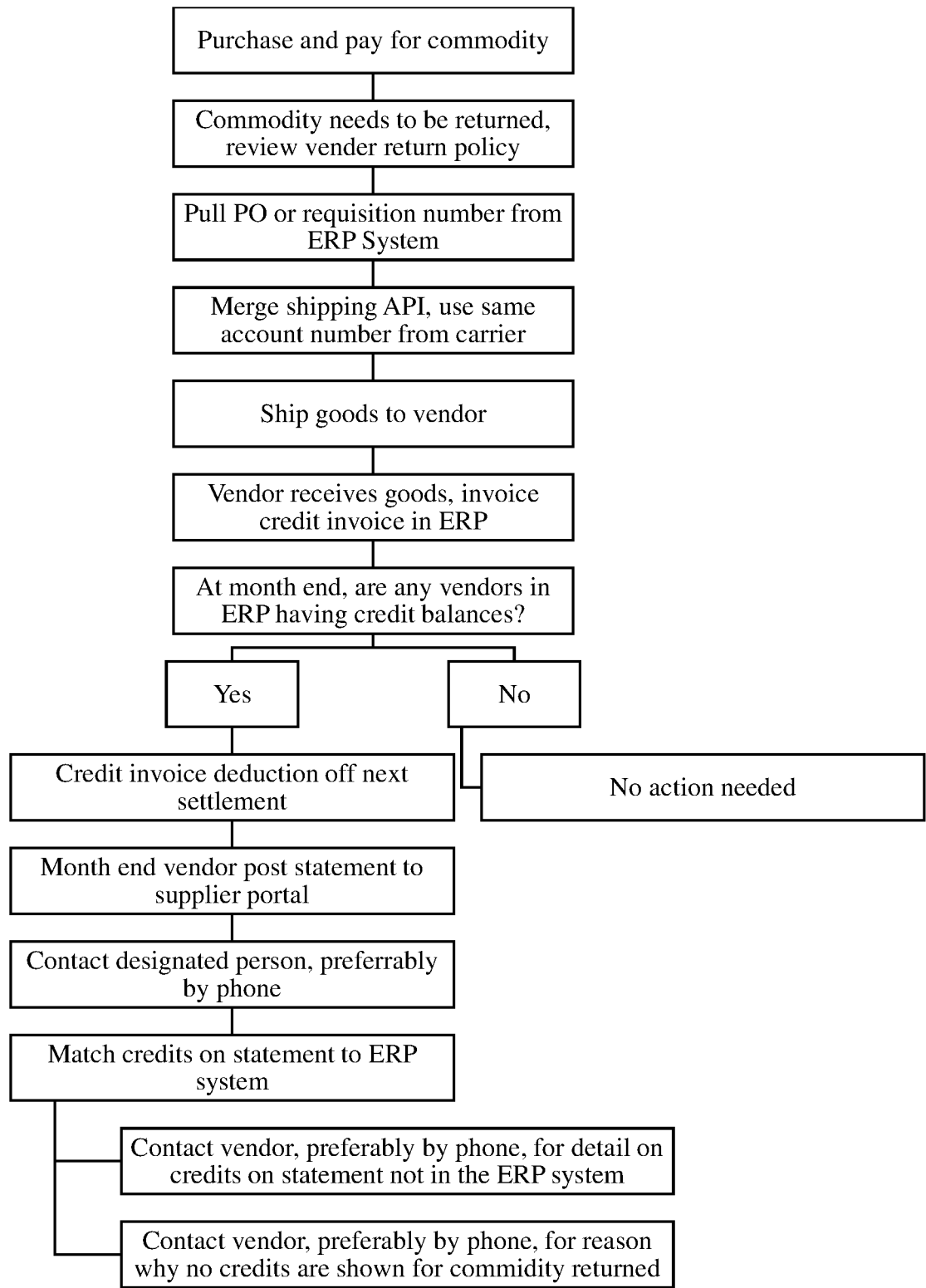
FIG. 1, is a flowchart diagram illustrating a method for processing the return of previously purchased commodities.

As shown in FIG. 1, the step-by-step method of returning previously purchased commodities, consists of the purchase of any commodity, for example, the purchase of a product, service, good, or any article of trade from a vendor, then, for whatever reason, it is determined that the commodity needs to be returned to the vendor. Next step is to review the vendor return policy and locate the purchase of the commodity to be returned on the enterprise resource planning (ERP) system using either the purchase order (PO) or requisition number, decide on the carrier who will return the commodity to the vendor, pull down the application programming interface (API) from the carrier to be used to send the commodity back to the vendor. Use the same account number from the carrier for ease of location of shipments to resolve any issues, wait until the carrier electronically notifies you of the delivery to the vendor, once in receipt of the carrier notification of delivery, process a credit invoice in the ERP system. Now that the credit has been entered, the next time a settlement occurs, the deduction should be shown. At month end, perform a reconciliation process to electronically confirm every step was executed according to the plan. At month end, the first query is to identify those vendors in the ERP system that have credit balances as the result of insufficient disbursements to cover the commodity returned. Contact the identified vendors, preferably by phone, to request the credit balance of funds be sent to you. Request all vendors to electronically provide monthly statements that show all transactions that occurred during the month. Electronically match the credits on the vendors' monthly statements to the credits in the ERP system. If the credits do not match, then contact the vendor, preferably by phone, to rectify. This step can also identify items that were returned directly to the vendor instead of following the outlined step-by-step process.

Figure 2:
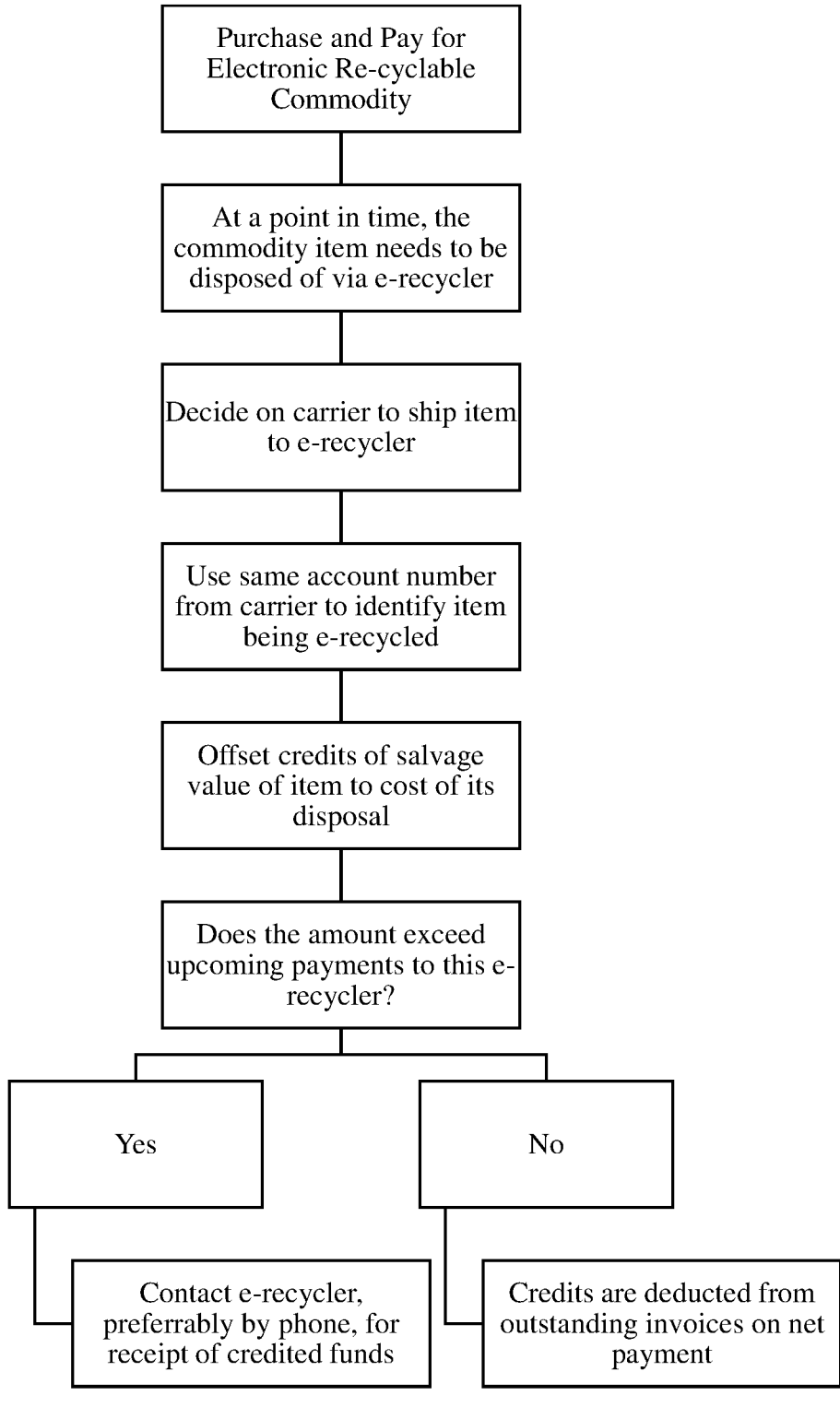
FIG. 2 is a flowchart diagram illustrating a method for processing the disposal of electronic equipment via an e-recycler.

As shown in FIG. 2, is the step-by-step method as it applies to the disposal of electronic items via an e-recycler, consists of identifying the types of electronic items to be e-recycled. For example, desktops, laptops, printers, servers, cell phones, scanners, ipads, generators, auto parts, and other electronic things. Decide upon a carrier to ship the items to the e-recycler. For ease of use and to resolve any issues, use the same account number from your selected carrier to ship the identified electronic items to the e-recycler for disposal. Depending on the amount of electronic item disposals, the preferred method is to offset the credits on the salvage value of those items to the items that cost money to dispose. Request the e-recycler to provide a monthly statement either directly to you or on the supplier portal. Compare the credits to the charges. If the credits exceed the charges, contact the e-recycler, preferably by phone, requesting the receipt of the credit funds.

Figure 3:
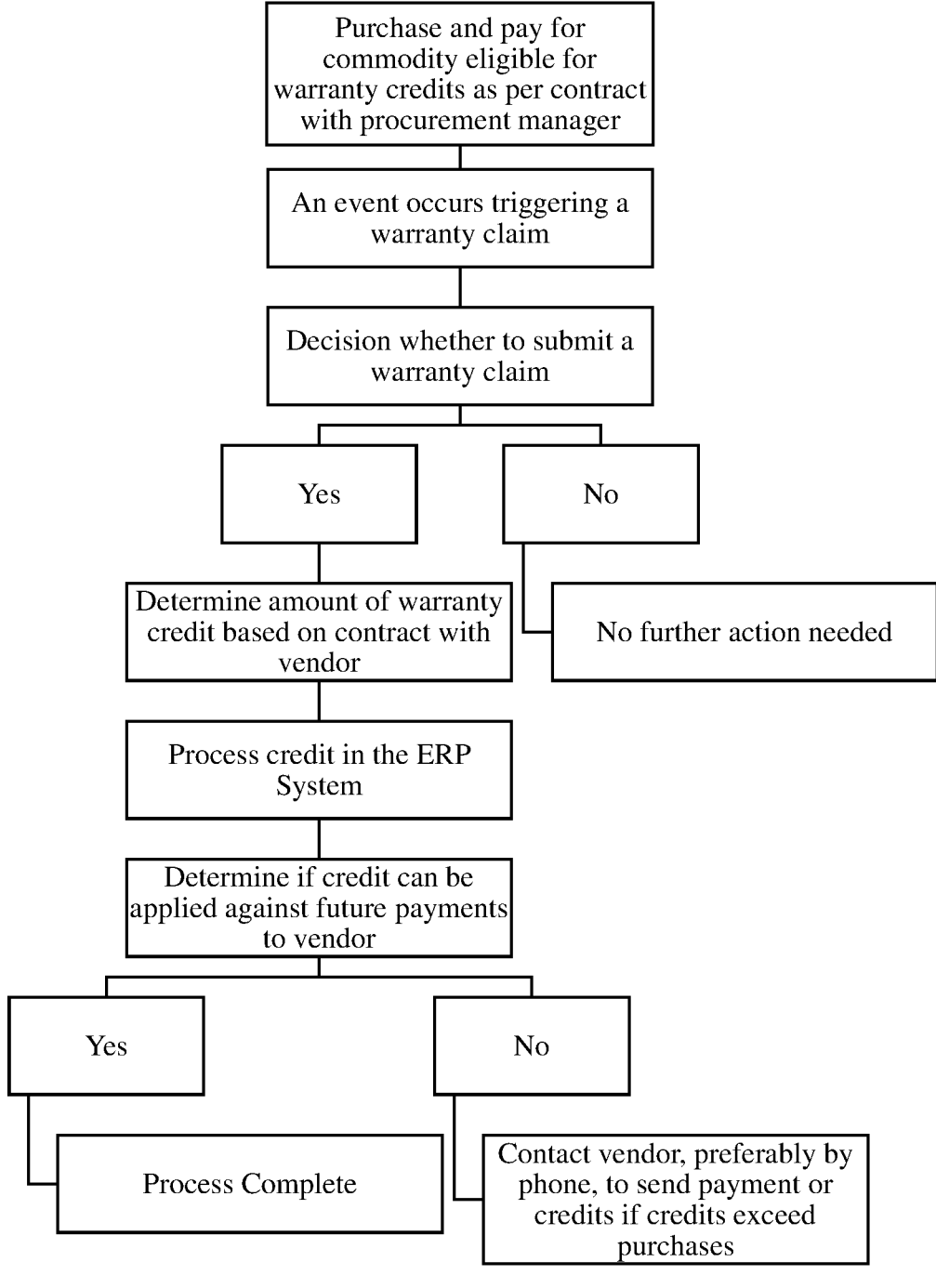
FIG. 3 is a flowchart diagram illustrating a method for processing warranty credits.

As shown in FIG. 3, the step-by-step method of Warranty Credits, consists of, the identify each commodity eligible for warranty credits, as defined in your contract with the procurement manager for each vendor. In the event a claim for warranty credits occurs relating to an identified eligible commodity, input a corresponding credit invoice with the vendor into the ERP system. Review the next scheduled settlement to decide whether the amount of the credit is deducted. Request all vendors that have warranty credits to provide monthly statements either directly to you or to the supplier portal. Any additional credits given by the vendor not taken in the ERP can then be entered and deducted at the next settlement date or contact the vendor, preferably by phone, if the credits exceed the purchases.

While the present invention is amenable to various modifications and alternative forms, specifics thereof have been shown by way of example in the drawings and will be described in detail. It should be understood, however, that the invention is not to limit the present invention to the particular embodiments described. On the contrary, the intention is to cover all modifications, equivalents, and alternatives falling within the spirit and scope of the present invention as defined by the appended claims.

I claim:

1. A method comprising:

identifying a leakage point in a purchase of any commodity or any article of trade from a supplier;

reviewing the supplier's return policy for the commodity or the article of trade;

locating the commodity or the article of trade product information to be returned on an enterprise resource planning (ERP) system using either a purchase order (PO) or a requisition number or a return materials authorization number;

selecting a carrier to ship the commodity or the article of trade back to the supplier;

obtaining an application programming interface (API) from the carrier to be used to ship the commodity or the article of trade back to the supplier using the carrier's account number for ease of location of shipments to resolve any issues and placing the PO number, requisition number, or return materials authorization number in the carrier reference field;

shipping the commodity or the article of trade back to the supplier and wait for the carrier's electronic notification of the delivery to the supplier;

creating a credit invoice using ChatGPT or trained artificial intelligence to access the ERP system using the supplier's original invoice for the expense code, original purchase order, manufacturer part number, unique supplier identification number, quantity and purchase price paid for the commodity or the article of trade for review at the next month account statement for validation of the corrected amount, and comparison to a next settlement payment the deduction will be shown;

using trained artificial intelligence and ChatGPT chatbot post data transactions for the commodity or article of trade returns to a dashboard for visibility and history of the transactions;

performing a reconciliation process at month end using trained artificial intelligence and ChatGPT chatbot to electronically confirm every step was executed according to the method;

identifying at month end the suppliers in the accounting ERP system whose credit balances exceed future disbursements to cover the commodity credit amount processed, contact the identified suppliers by email through the use of trained artificial intelligence or Chat GPT to request a credit balance of funds;

requesting the suppliers to electronically provide monthly statements showing the transactions that occurred during the month and posting the transactions to the dashboard; and, using artificial intelligence match the credits on the suppliers' monthly statements to the credits in the accounting ERP system, if the credits do not match, contact the supplier, preferably by phone or email to rectify and to identify the commodities or the articles of trade that were returned directly to the supplier instead of following the outlined step-by-step method.

2. A method comprising:

purchasing an electronic item or items eligible for e-recycling;

identifying the electronic item or items to be e-recycled by using ChatGPT or trained artificial intelligence to obtain the manufacturer part number, Stock-Keeping Unit, unique supplier identification number to identify if the electronic item needs to be written off in the fixed asset general ledger;

selecting a carrier to ship the electronic item or items to the e-recycler;

shipping the electronic item or items to the e-recycler for disposal using an account number from the carrier;

offsetting the credits of a salvage value of the electronic items to the electronic items that incur expense to dispose;

requesting the e-recycler to provide a monthly statement to be posted to a secure file transfer protocol site which can be the supplier, client or third party in order to be placed on the dashboard or request the e-recycler to load the information on the e-recycler's portal;

comparing the credits to the charges through the use of artificial intelligence and ChatGPT; and, contacting the e-recycler via the software using the purchaser's email address to the e-recycler's email address, preferably by phone, requesting a refund check for any credit balance.

3. A method comprising:

purchasing a commodity eligible for warranty credits from a supplier;

identifying the commodity eligible for warranty credits that failed to perform as pursuant to warranty specifications as defined in a contract with a procurement manager for the supplier;

shipping or requesting the supplier to pick up the eligible commodity for the warranty credits;

creating a credit invoice using ChatGPT or trained artificial intelligence to gather commodity eligible for warranty credits' purchase order original invoice, quantity, price to be determined based on either full or partial credit based on the percentage of time commodity used as defined in the warranty specifications in a contract with a procurement manager for the supplier;

inputting a corresponding credit invoice for the eligible commodity for the supplier into an accounting enterprise resource planning (ERP) system placing a zero in the credit invoice until the supplier provides a credit amount;

requesting the supplier with warranty credits to provide monthly statements to a secure file transfer protocol site which can be the supplier, client or third party indicating transactions for the month either by loading directly to the ERP system or a dashboard;

matching transactions on the supplier's statements to the transactions in the ERP system;

performing a reconciliation at month end through the use of artificial intelligence and Chat GPT to confirm every step was executed according to the method;

entering and deducting at the next scheduled payment any additional credits given by the supplier not taken in the accounting ERP system;

contacting the supplier by email using ChatGPT or trained artificial intelligence if credit is outstanding and by using the software to send out from the purchaser's email address to the supplier's email address to have a credit posted to the account; and, requesting a refund check from the supplier if credits exceed the amount of the outstanding credit invoices.

\* \* \* \* \*